US012768507B2

(12) United States Patent
Lu et al.

(10) Patent No.: US 12,768,507 B2
(45) Date of Patent: Oct. 20, 2026

(54) HIGH LUMINOUS-EFFICACY LINEAR LIGHTING DEVICE

(71) Applicant: Xiamen PVTECH Co., Ltd., Xiamen (CN)

(72) Inventors: Fuxing Lu, Xiamen (CN); Weibiao Zhong, Xiamen (CN); Jinsheng Li, Xiamen (CN)

(73) Assignee: Xiamen PVTECH Co, Ltd., Xiamen (CN)

( * ) Notice: Subject to any disclaimer, the term of this patent is extended or adjusted under 35 U.S.C. 154(b) by 0 days.

(21) Appl. No.: 19/271,793

(22) Filed: Jul. 17, 2025

(65) Prior Publication Data

US 2026/0022809 A1 Jan. 22, 2026

(30) Foreign Application Priority Data

Jul. 17, 2024 (CN) ......................... 202410959875.8

(51) Int. Cl.
*F21S 4/28* (2016.01)
*F21V 3/06* (2018.01)
*F21V 17/16* (2006.01)
*F21V 23/02* (2006.01)
*F21Y 103/10* (2016.01)

(52) U.S. Cl.
CPC ................ *F21S 4/28* (2016.01); *F21V 3/062* (2018.02); *F21V 17/164* (2013.01); *F21V 23/023* (2013.01); *F21Y 2103/10* (2016.08)

(58) Field of Classification Search
CPC .. F21Y 2103/10; F21V 23/023; F21V 17/164; F21V 3/062; F21V 19/004; F21S 4/28; F21S 8/04; F21S 8/038
See application file for complete search history.

(56) References Cited

U.S. PATENT DOCUMENTS 9,982,872 B1 * 5/2018 Kearney ............... F21V 29/508
2014/0268720 A1 9/2014 Dungan et al.
(Continued)

FOREIGN PATENT DOCUMENTS

CN 205824809 12/2016
EP 2511596 A1 10/2012
(Continued)

OTHER PUBLICATIONS

Innovation Q+ NPL Search (Year: 2026).*

*Primary Examiner* — Anabel Ton
(74) *Attorney, Agent, or Firm* — BruceStone LLP; Joseph A. Bruce

(57) ABSTRACT

A high luminous-efficacy linear lighting device includes a tubular light cover, a support plate and a light source board. The tubular light cover has a light-emitting portion and a light-shielding portion. The light-emitting surface of the light-emitting portion is a curved surface. The bottom of the light-emitting portion has a lower opening. The top of the light-shielding portion has an upper opening. The bottom of the light-emitting portion is connected to the top of the light-shielding portion. The width of the bottom of the light-emitting portion is greater than the width of the top of the light-shielding portion. The support plate is disposed within the light-shielding portion and adjacent to the upper opening. The light source board is disposed on one side of the support plate and faces the light-emitting portion.

8 Claims, 14 Drawing Sheets

(56) References Cited

U.S. PATENT DOCUMENTS

| | | | | |
|---|---|---|---|---|
| 2015/0345755 | A1* | 12/2015 | Purdy | F21K 9/275 362/219 |
| 2020/0340633 | A1* | 10/2020 | Chen | F21S 8/061 |
| 2023/0272891 | A1 | 8/2023 | Ji et al. | |

FOREIGN PATENT DOCUMENTS

| | | | |
|---|---|---|---|
| EP | 3268664 | B1 | 5/2020 |
| JP | 2004335317 | A | 11/2004 |
| JP | 2006134617 | A | 5/2006 |
| JP | 2017195204 | A | 10/2017 |
| WO | 2014125765 | A1 | 8/2014 |
| WO | 2016135768 | A1 | 9/2016 |

* cited by examiner

HIGH LUMINOUS-EFFICACY LINEAR LIGHTING DEVICE

BACKGROUND OF THE INVENTION

1. Field of the Invention

The present invention relates to a lighting device, in particular to a high luminous-efficacy linear lighting device.

2. Description of the Prior Art

Currently available inverted-Fuji (mountain-shaped) lighting devices feature a unique design and lighting characteristics. The primary characteristic lies in the triangular base or inverted conical base design thereof. This design facilitates uniform light distribution and efficient space utilization, so these lighting devices can be comprehensively applied to various buildings.

However, the currently available inverted-Fuji lighting devices still have several shortcomings requiring improvement. For instance, the optical structure of current designs causes partial light loss from the light source board, significantly reducing the luminous efficacy thereof.

Additionally, the installation process for the currently available inverted Fuji-shaped lighting devices is relatively complex, demanding substantial labor input which increases manpower costs.

SUMMARY OF THE INVENTION

One embodiment of the present invention provides a high luminous-efficacy linear lighting device, which includes a tubular light cover, a support plate and a light source board. The tubular light cover has a light-emitting portion and a light-shielding portion. The light-emitting surface of the light-emitting portion is a curved surface. The bottom of the light-emitting portion has a lower opening. The top of the light-shielding portion has an upper opening. The bottom of the light-emitting portion is connected to the top of the light-shielding portion. The width of the bottom of the light-emitting portion is greater than the width of the top of the light-shielding portion. The support plate is disposed within the light-shielding portion and adjacent to the upper opening. The light source board is disposed on one side of the support plate and faces the light-emitting portion.

In one embodiment, the tubular light cover is made of plastic.

In one embodiment, the linear lighting device further includes a power module disposed on the other side of the support plate and within the light-shielding portion. The power module is electrically connected to the light source board In one embodiment, the linear lighting device further includes a base, and the tubular light cover is disposed on the base.

In one embodiment, the base has a central groove. The tubular light cover is disposed on the central groove and seals the central groove, such that the light-shielding portion is disposed within the central groove while the light-emitting portion is exposed outside the central groove.

In one embodiment, the linear lighting device further includes a clip. The clip is U-shaped and includes a bottom plate, two side walls, and two protrusions. The bottom plate is fixed to the bottom of the central groove. The protrusions are respectively disposed on the side walls. The light-shielding portion has two grooves respectively disposed on the two sides of the light-shielding portion. The protrusions are respectively embedded in the two grooves, such that the clip and the light-shielding portion are fixed with each other.

In one embodiment, the bottom of the central groove further has an installation hole, and the installation hole is in the shape of a keyhole.

In one embodiment, the linear lighting device further includes two end caps and two safety ropes. The end caps are respectively disposed at the two ends of the tubular light cover and are respectively connected to the two ends of the base via the two safety ropes.

In one embodiment, each of the end caps has a fixing structure. Each of the safety ropes includes a rope body and a ball head connected to one end of the rope body. The ball head is fixed to the fixing structure, and the other end of the rope body is fixed to one end of the base.

In one embodiment, the fixing structure includes a post and a fixing hook. one end of the fixing hook is fixed to the bottom of the end cap, and the other end of the fixing hook is spaced apart from the bottom of the end cap to form an entrance. The post is fixed to the bottom of the end cap and disposed on one side of the entrance. The rope body passes through the central hole of the fixing hook, such that the ball head is simultaneously limited by the post and the fixing hook.

The high luminous-efficacy linear lighting device in accordance with the embodiments of the present invention may have the following advantages:

(1) In one embodiment of the present invention, the linear lighting device includes a tubular light cover, a support plate and a light source board. The tubular light cover has a light-emitting portion and a light-shielding portion. The light-emitting surface of the light-emitting portion is a curved surface. The bottom of the light-emitting portion has a lower opening. The top of the light-shielding portion has an upper opening. The bottom of the light-emitting portion is connected to the top of the light-shielding portion. The width of the bottom of the light-emitting portion is greater than the width of the top of the light-shielding portion. The support plate is disposed within the light-shielding portion and adjacent to the upper opening. The light source board is disposed on one side of the support plate and faces the light-emitting portion. Since the width of the bottom of the light-emitting portion is greater than the width of the top of the light-shielding portion, most of the light emitted from the light source board can pass through the light-emitting portion without being blocked by the light-shielding portion. This optical structure design can effectively reduce light loss from the light source board, such that the luminous efficacy of the linear lighting device can be significantly improved.

(2) In one embodiment of the present invention, the electronic components including the light source board and power module of the linear lighting device are all disposed within the tubular light cover thereof. The tubular light cover may be made of plastic, making it an all-plastic structure. This all-plastic structure can effectively prevent reverse voltage generation with a view to significantly improving the safety of the linear lighting device.

(3) In one embodiment of the present invention, the power module of the linear lighting device is disposed within the tubular light cover thereof and is not housed in a power box, being only wrapped in plastic film. This built-in power module design not only effectively prevents reverse voltage generation to improve safety but also significantly simplifies the structure of the linear lighting device.

(4) In one embodiment of the present invention, the linear lighting device further includes a base and a plurality of clips. The tubular light cover is disposed on the base. The base has a central groove, and the tubular light cover is disposed on the central groove and seals the central groove, so that the light-shielding portion is located within the central groove while the light-emitting portion is exposed outside the central groove. Each clip is U-shaped and includes a bottom plate, two side walls, and two protrusions. The bottom plate is fixed to the bottom of the central groove, and the protrusions are respectively disposed on the two side walls. The light-shielding portion has two recesses respectively disposed on the two sides of the light-shielding portion, and the two protrusions are respectively embedded in the two recesses to mutually fix the clip and the light-shielding portion. Through this single-side fastening structure, the tubular light cover can be fixed to the base without requiring additional fastening structures, simplifying the structure of the tubular light cover. Furthermore, these clips are not exposed outside the central groove, allowing the base structure to be further simplified. This structural design makes the linear lighting device more convenient for transportation and less prone to damage during transit.

(5) In one embodiment of the present invention, the light source board of the linear lighting device is disposed on the support plate thereof, which can be made of a high thermal conductivity material (various metals such as copper, iron, aluminum, stainless steel, etc.) and is disposed within the tubular light cover. Therefore, the support plate not only provides heat dissipation effect but also serves as a structural support to enhance the structural strength of the tubular light cover. Additionally, the light source board is coated with reflective paint to improve luminous efficacy. Consequently, the service life of the linear lighting device can be effectively extended while further improving luminous efficacy to meet actual requirements.

(6) In one embodiment of the present invention, the linear lighting device further includes two end caps and two safety ropes. The two end caps are respectively disposed at the two ends of the tubular light cover and are respectively connected to the two ends of the base through the two safety ropes. Each end cap has a fixing structure. Each safety rope includes a rope body and a ball head connected to one end of the rope body. The ball head is fixed to the fixing structure, while the other end of the rope body is fixed to one end of the base. The fixing structure includes a post and a fixing hook. One end of the fixing hook is fixed to the bottom of the end cap, and the other end of the fixing hook is spaced apart from the bottom of the end cap to form an entrance. The post is fixed to the bottom of the end cap and disposed on one side of the entrance. The rope body passes through a central hole of the fixing hook so that the ball head is simultaneously limited by both the post and the fixing hook. Through this fixing structure design, the two end caps can be stably and quickly connected to the two ends of the base via the two safety ropes to prevent the tubular light cover from falling. Additionally, the user can temporarily hang the tubular light cover on the base using these safety ropes for wiring operations. Therefore, the installation process of the linear lighting device can be significantly simplified to reduce labor costs, while further improving the safety of the linear lighting device.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
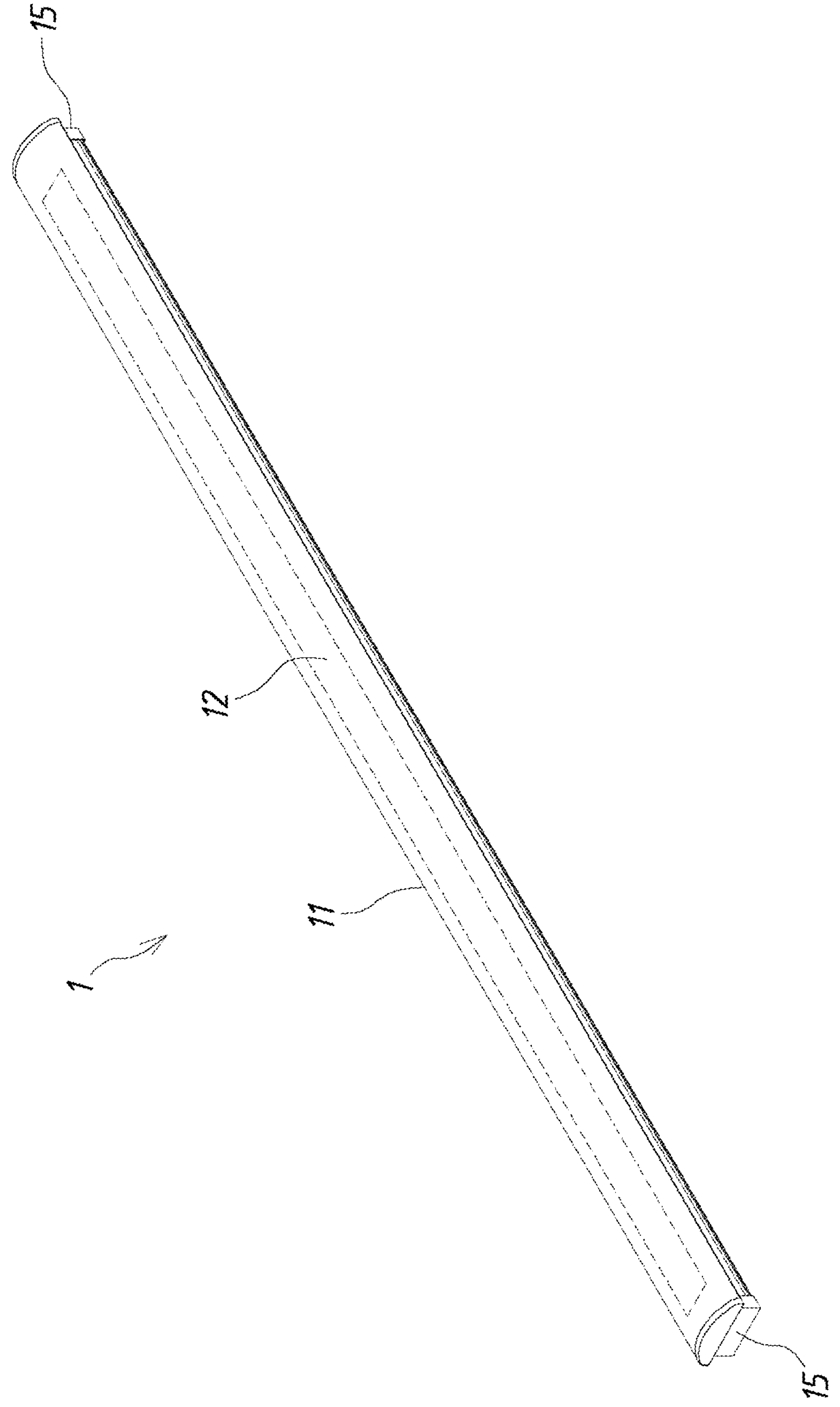
FIG. 1 is a perspective view of a high luminous-efficacy linear lighting device in accordance with a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
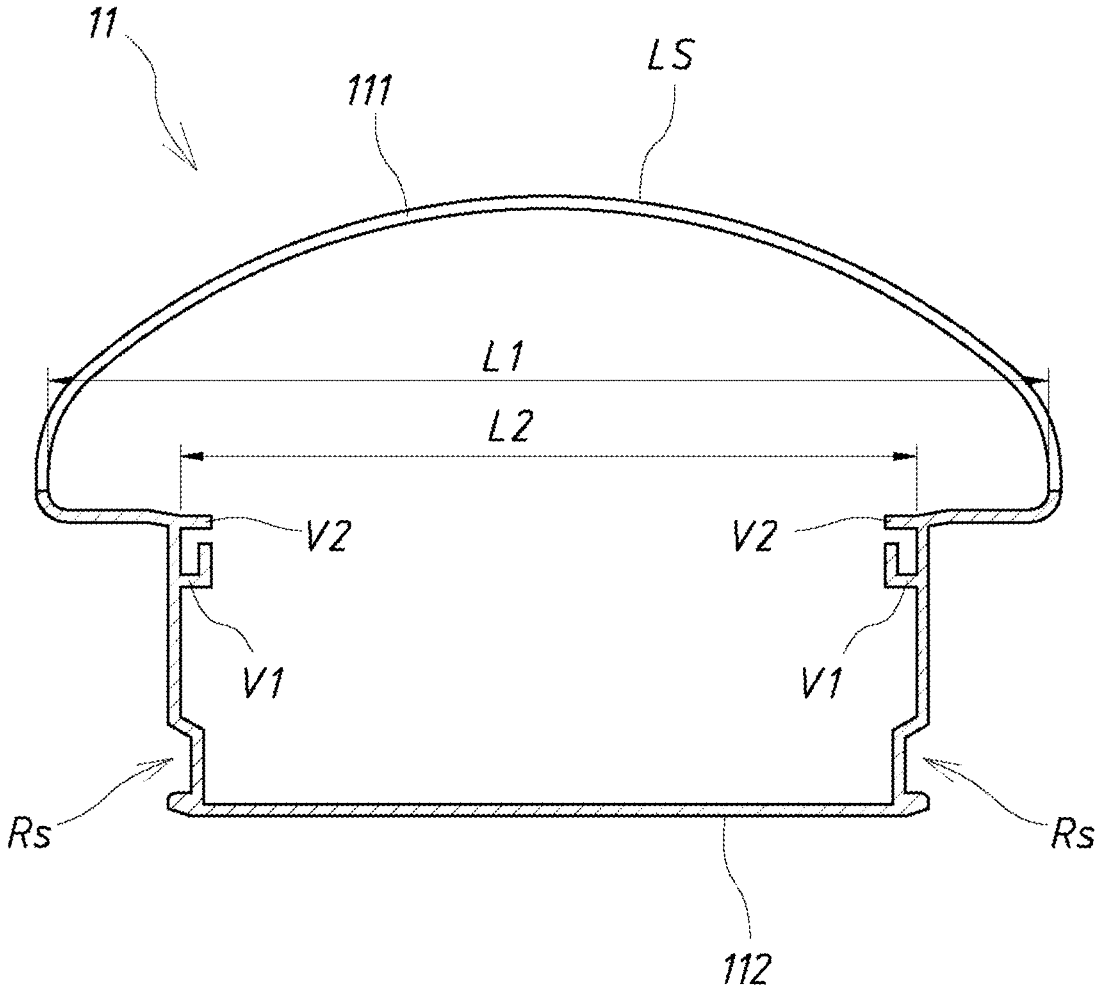
FIG. 2 is a first sectional view of the high luminous-efficacy linear lighting device in accordance with the first embodiment of the present invention (without a support plate, a light source board and a power module).
Figure 3:
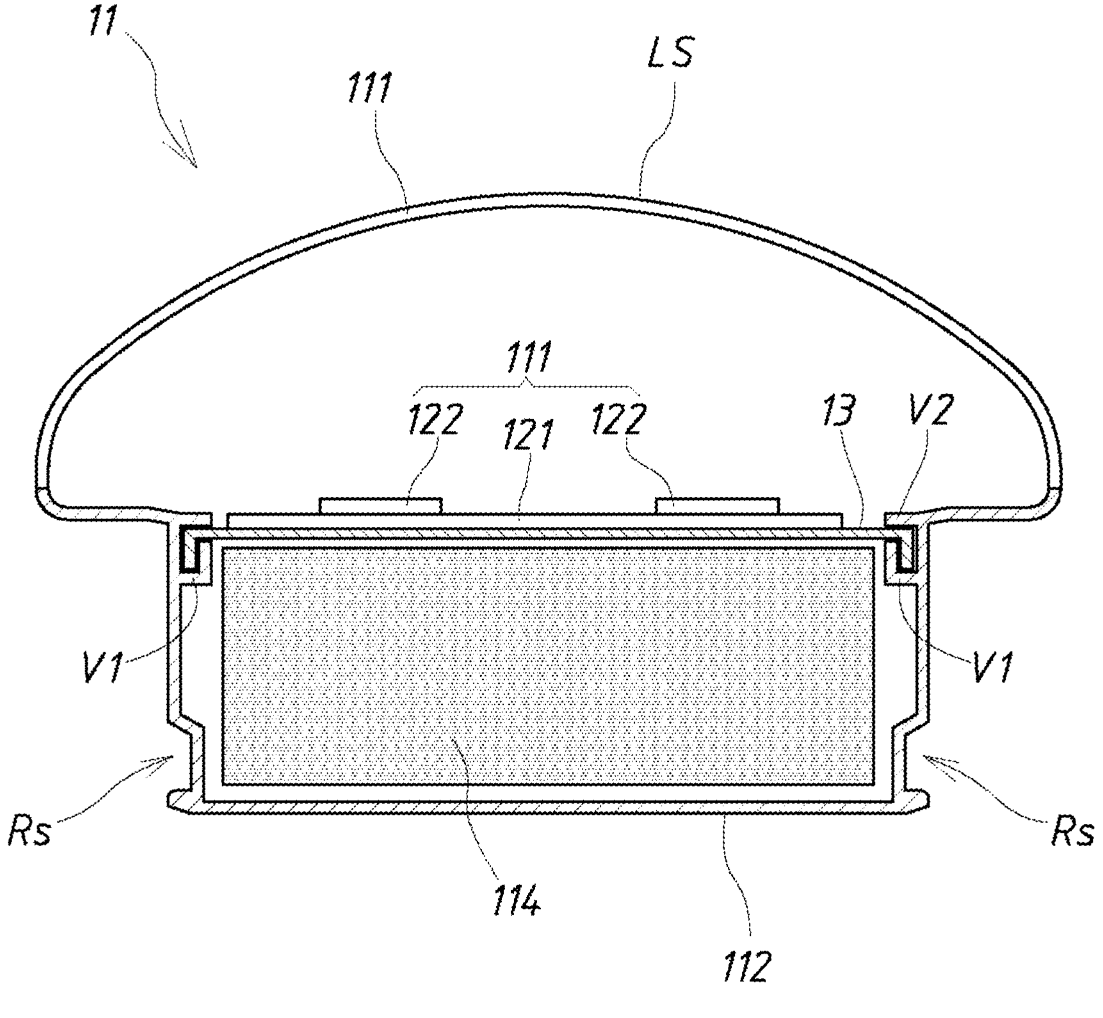
FIG. 3 is a second sectional view of the high luminous-efficacy linear lighting device in accordance with the first embodiment of the present invention (with the support plate, the light source board and the power module).
Figure 4:
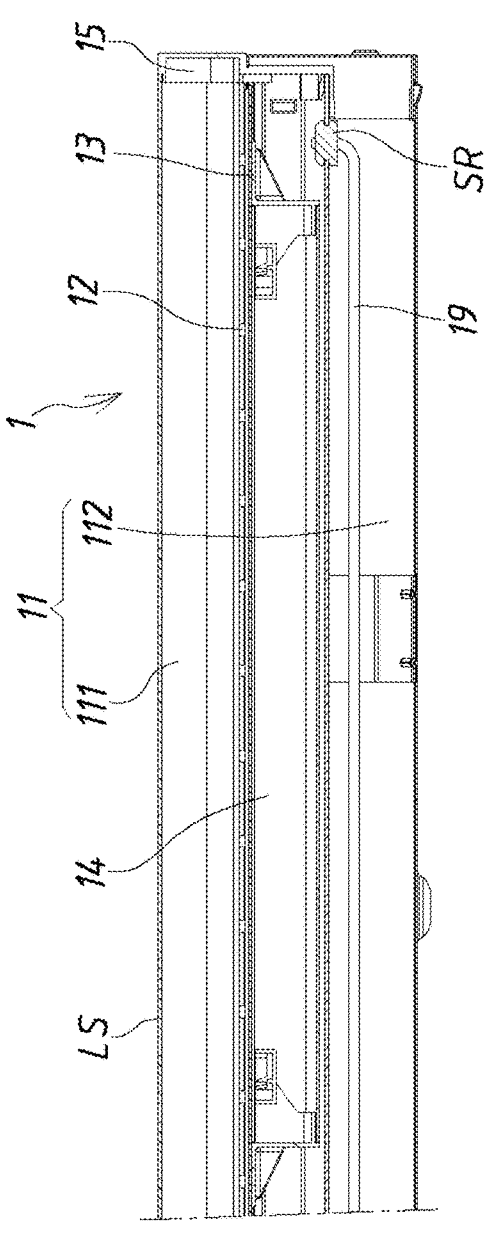
FIG. 4 is a third sectional view of the high luminous-efficacy linear lighting device in accordance with the first embodiment of the present invention.

Please refer to FIG. 1, FIG. 2, FIG. 3 and FIG. 4. FIG. 1 is a perspective view of a high luminous-efficacy linear lighting device in accordance with a first embodiment of the present invention. FIG. 2 is a first sectional view of the high luminous-efficacy linear lighting device in accordance with the first embodiment of the present invention (without a support plate, a light source board and a power module). FIG. 3 is a second sectional view of the high luminous-efficacy linear lighting device in accordance with the first embodiment of the present invention (with the support plate, the light source board and the power module). FIG. 4 is a third sectional view of the high luminous-efficacy linear lighting device in accordance with the first embodiment of the present invention. As shown FIG. 1, FIG. 2, FIG. 3 and FIG. 4, the linear lighting device 1 includes a tubular light cover 11, a light source board 12, a support plate 13, a power module 14, and two end caps 15.

The tubular light cover 11 has a light-emitting portion 111 and a light-shielding portion 112. The end caps 15 are respectively disposed at the two ends of the tubular light cover 11. In this embodiment, the tubular light cover 11 is an all-plastic structure made of plastic (this material may be various currently available plastic materials, including but not limited to PMMA, PC, etc.). The light-emitting surface LS of the light-emitting portion 111 is a curved surface. The bottom of the light-emitting portion 111 has a lower opening, while the top of the light-shielding portion 112 has an upper opening; the light-shielding portion 112 has two recesses Rs respectively disposed on the two sides thereof. The bottom of the light-emitting portion 111 is connected to the top of the light-shielding portion 112. Additionally, the width L1 of the bottom of the light-emitting portion 111 is greater than the width L2 of the top of the light-shielding portion 112. The all-plastic structure can effectively prevent reverse voltage generation, significantly improving the safety of the linear lighting device 1.

The support plate 13 is disposed within the light-shielding portion 112 and adjacent to the upper opening. The support plate 13 has a U-shaped cross-section, with the two sides of the support plate 13 respectively fixed to the two inner walls of the light-shielding portion 112. Each inner wall has an L-shaped hook portion V1 and a limiting plate V2. The limiting plate V2 is disposed above the L-shaped hook portion V1. The two sides of the support plate 13 can be respectively embedded into the two L-shaped hook portions V1, while the two limiting plates V2 can provide limiting functions to prevent the support plate 13 from disengaging from the two L-shaped hook portions V1. The support plate 13 may be made of a high thermal conductivity material. This material may be various metals such as copper, iron, aluminum, stainless steel, etc. Therefore, the support plate 13 can not only provide heat dissipation effect but also serve as a support to enhance the structural strength of the tubular light cover 11.

The light source board 12 is disposed on one side of the support plate 13 and faces the light-emitting portion 111. The light source board 12 may include a circuit board 121 and a plurality of light sources 122 disposed on the circuit board 121. In this embodiment, the light sources 122 may be light-emitting diodes (LEDs). In another embodiment, the light source board 12 may also use other light-emitting units (such as fluorescent lamps, bulbs, etc.) as substitutes. The light source board 12 is further coated with reflective paint, which can provide reflective effects to improve luminous efficacy.

The power module 14 is disposed on the other side of the support plate 13 and located within the light-shielding portion 112. The power module 14 is electrically connected to the light source board 12. The power module 14 can be directly disposed within the light-shielding portion 112 without requiring an additional power box. Additionally, the power module 14 may only be wrapped in plastic film. In one embodiment, the power module 14 is an LED driver. In another embodiment, the power module 14 may also be a driver for other currently available light sources. The built-in power module 14 design can not only improve the safety of the linear lighting device 1 but also significantly simplify the structure of the linear lighting device 1.

As previously stated, since the width L1 of the bottom of the light-emitting portion 111 is greater than the width L2 of the top of the light-shielding portion 112, most of the light emitted by the light source board 12 can pass through the light-emitting portion 111 without being blocked by the light-shielding portion 112. This optical structure design can effectively reduce light loss from the light source board 12, significantly improving the luminous efficacy of the linear lighting device 1.

The embodiment just exemplifies the present invention and is not intended to limit the scope of the present invention; any equivalent modification and variation according to the spirit of the present invention is to be also included within the scope of the following claims and their equivalents.

Figure 5:
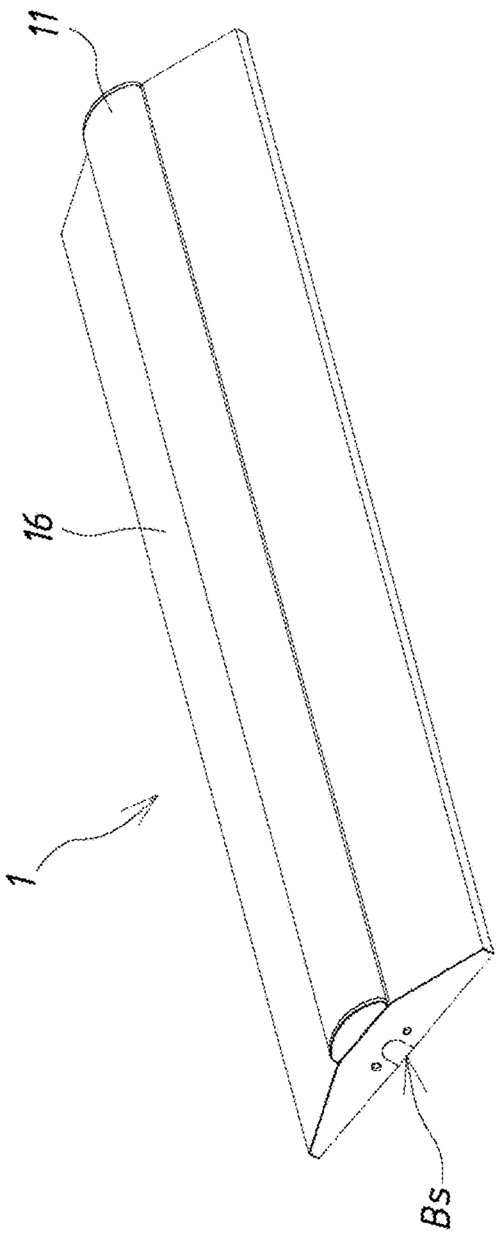
FIG. 5 is a perspective view of a high luminous-efficacy linear lighting device in accordance with a second embodiment of the present invention.
Figure 6:
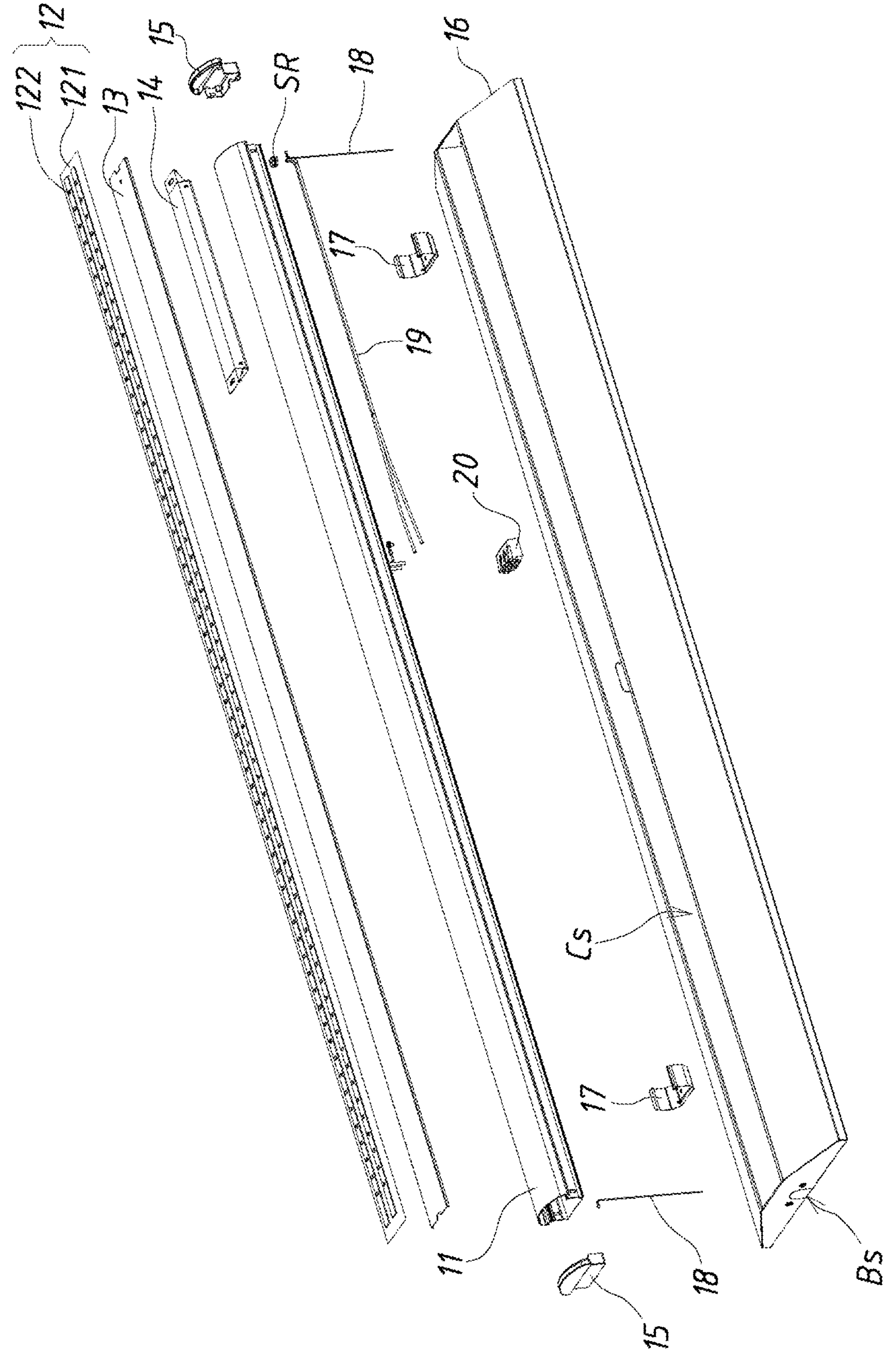
FIG. 6 is an exploded view of the high luminous-efficacy linear lighting device in accordance with the second embodiment of the present invention.
Figure 7:
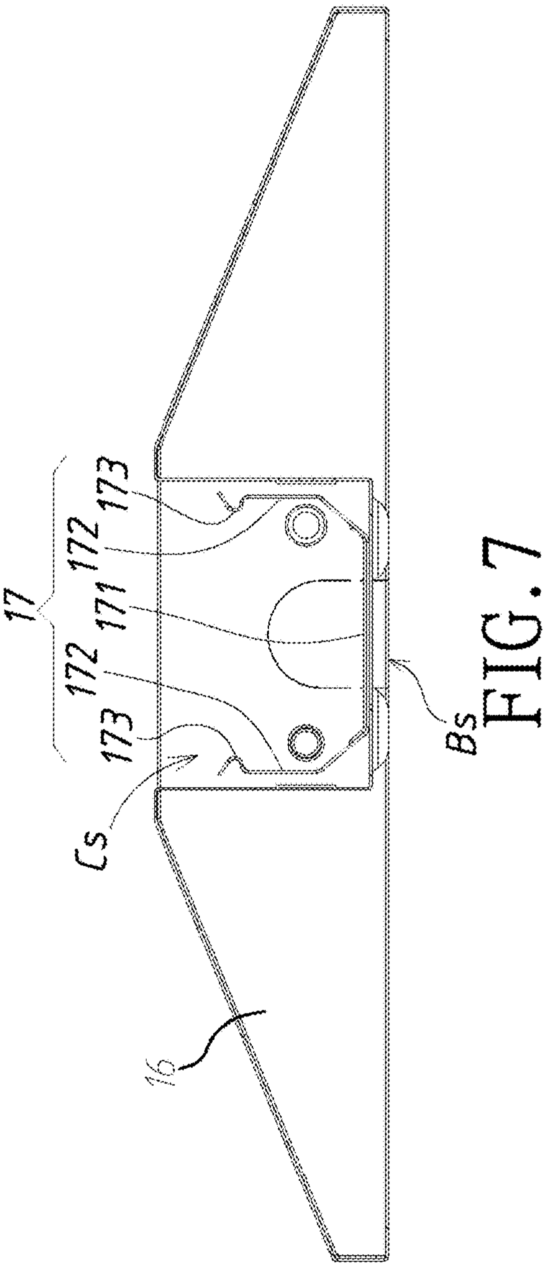
FIG. 7 is a side view of a base of the high luminous-efficacy linear lighting device in accordance with the second embodiment of the present invention.
Figure 8:
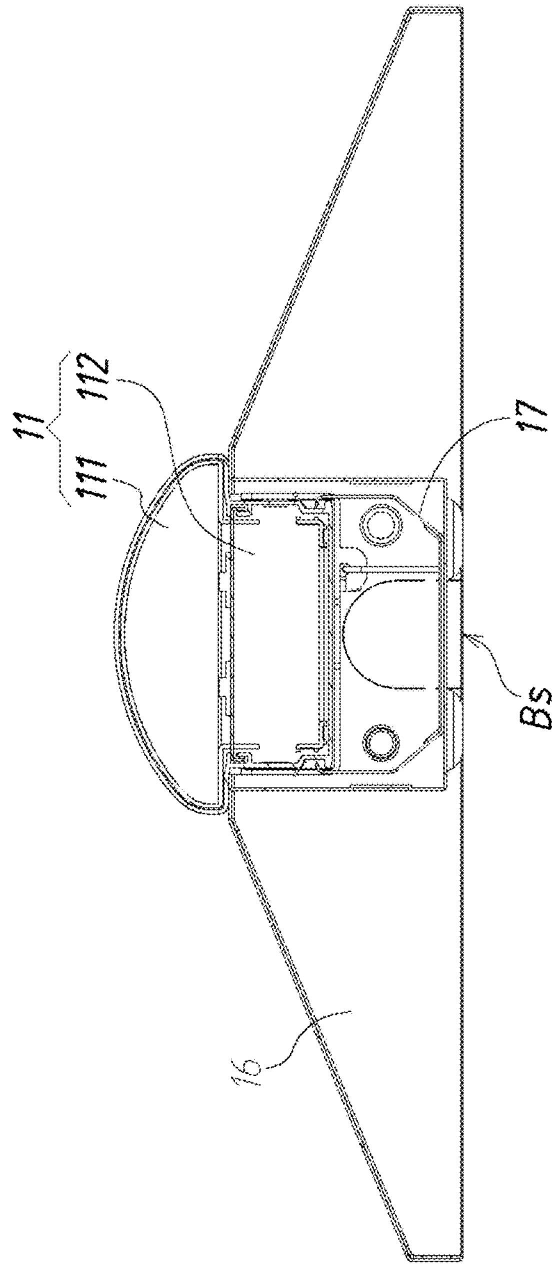
FIG. 8 is a schematic view illustrating combining the base and a tubular light cover of the high luminous-efficacy linear lighting device in accordance with the second embodiment of the present invention.
Figure 9:
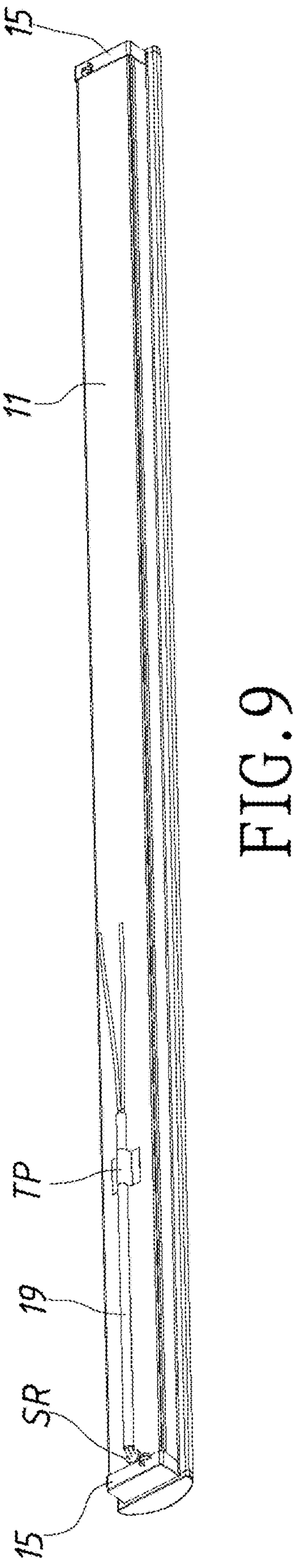
FIG. 9 is a schematic view of an electrical connection wire of the high luminous-efficacy linear lighting device in accordance with the second embodiment of the present invention.

Please refer to FIG. 5, FIG. 6, FIG. 7, FIG. 8, and FIG. 9, and also refer to FIG. 1 to FIG. 4. FIG. 5 is a perspective view of a high luminous-efficacy linear lighting device in accordance with a second embodiment of the present invention. FIG. 6 is an exploded view of the high luminous-efficacy linear lighting device in accordance with the second embodiment of the present invention. FIG. 7 is a side view of a base of the high luminous-efficacy linear lighting device in accordance with the second embodiment of the present invention. FIG. 8 is a schematic view illustrating combining the base and a tubular light cover of the high luminous-efficacy linear lighting device in accordance with the second embodiment of the present invention. FIG. 9 is a schematic view of an electrical connection wire of the high luminous-efficacy linear lighting device in accordance with the second embodiment of the present invention. As shown in FIG. 5, FIG. 6, FIG. 7, FIG. 8, and FIG. 9, the linear lighting device 1 includes a tubular light cover 11, a light source board 12, a support plate 13, a power module 14, and two end caps 15.

The aforementioned elements are similar to those in the previous embodiment. The difference between this embodiment and the previous embodiment is that in this embodiment, the linear lighting device 1 further includes a base 16, two clips 17, and two safety ropes 18.

The base 16 has a central groove Cs. The tubular light cover 11 is disposed on the central groove Cs and seals the central groove Cs, such that the light-shielding portion 112 is located within the central groove Cs while the light-emitting portion 111 is exposed outside the central groove Cs. Additionally, the two ends of the base 16 may have knockout holes Bs. When several linear lighting devices 1 need to be connected in series, the covers of these knockout holes Bs can be removed. Then, electrical connection wires can pass through these knockout holes Bs to electrically connect these linear lighting devices 1.

The two clips 17 may be made of a metal material such as copper, iron, aluminum, stainless steel, etc. Each clip 17 is U-shaped and includes a bottom plate 171, two side walls 172, and two protrusions 173. The bottom plate 171 is fixed to the bottom of the central groove Cs, and the two protrusions 173 are respectively disposed on the two side walls 172. Each clip 17 is not exposed outside the central groove Cs. As mentioned earlier, the light-shielding portion 112 has two recesses Rs respectively disposed on the two sides thereof, and the two protrusions 173 are respectively embedded in these two recesses Rs, mutually fixing the clip 17 and the light-shielding portion 112. Thus, the tubular light cover 11 is fixed to the base 16 via these two clips 17. The number of clips 17 can be adjusted according to actual needs; in another embodiment, the linear lighting device 1 may include only one clip 17 or three or more clips 17. Through this single-side fastening structure, the tubular light cover 11 can be fixed to the base 16 without requiring additional fastening structures, simplifying the structure of the tubular light cover 11. Moreover, since these clips 17 are not exposed outside the central groove Cs, the structure of the base 16 can also be simplified. This structural design makes the linear lighting device 1 more convenient for transportation and less prone to damage during transit.

The two end caps 15 are respectively disposed at the two ends of the tubular light cover 11 and are respectively connected to both ends of the base 16 via the two safety ropes 18. These two end caps 15 provide waterproof and dustproof effects, enhancing the safety and service life of the linear lighting device 1.

The linear lighting device 1 further includes an electrical connection wire 19 and a terminal block 20. The power module 14 is connected to the electrical connection wire 19, which passes through a connection hole to connect to the terminal block 20. The connection hole is disposed near one of the end caps 15. This connection hole may be provided with a sealing ring SR (such as a rubber ring) to achieve waterproof and dustproof effects. The terminal block 20 can be disposed on the back of the tubular light cover 11. In this embodiment, the electrical connection wire 19 may be fixed to the back of the tubular light cover 11 using adhesive tape TP or other similar methods, but is not limited thereto.

As described above, since the width of the bottom of the light-emitting portion 111 is greater than the width of the top of the light-shielding portion 112, most of the light emitted by the light source board 12 can pass through the light-emitting portion 111 without being blocked by the light-shielding portion 112. This optical structure design can effectively reduce light loss from the light source board 12, significantly improving the luminous efficacy of the linear lighting device 1.

Additionally, the electronic components such as the light source board 12 and power module 14 of the linear lighting device 1 are all disposed within the tubular light cover 11 thereof. The tubular light cover 11 may be made of plastic, forming an all-plastic structure. This all-plastic structure can effectively prevent reverse voltage generation, significantly improving the safety of the linear lighting device 1.

Furthermore, the power module 14 of the linear lighting device 1 is disposed within the tubular light cover 11 thereof and is not housed in a power box, being only wrapped in plastic film. This built-in power module design not only effectively prevents reverse voltage generation to improve safety but also significantly simplifies the structure of the linear lighting device 1.

Moreover, through this single-side fastening structure, the tubular light cover 11 can be fixed to the base 16 without requiring additional fastening structures, simplifying the structure of the tubular light cover 11. Additionally, since these clips 17 are not exposed outside the central groove Cs, the structure of the base 16 can also be simplified. This structural design makes the linear lighting device 1 more convenient for transportation and less prone to damage during transit.

Furthermore, the light source board 12 of the linear lighting device 1 is mounted on its support plate 13, which may be made of a high thermal conductivity material (various metals such as copper, iron, aluminum, stainless steel, etc.) and is disposed within the tubular light cover 11. Therefore, the support plate 13 not only provides heat dissipation effect but also serves as a structural support to enhance the structural strength of the tubular light cover 11. Additionally, the light source board 12 is coated with reflective paint to improve luminous efficacy. Consequently, the service life of the linear lighting device 1 can be effectively extended while further improving luminous efficacy to meet actual requirements.

Thus, the structural design of the linear lighting device 1 is well-suited for application in inverted-Fuji (mountain-shaped) lighting devices to achieve high performance. The structural design of linear lighting device 1 can also be applied to various other currently available lighting devices.

The embodiment just exemplifies the present invention and is not intended to limit the scope of the present invention; any equivalent modification and variation according to the spirit of the present invention is to be also included within the scope of the following claims and their equivalents.

It is worthy to point out that the currently available inverted-Fuji lighting devices still have several shortcomings requiring improvement. For instance, the optical structure of current designs causes partial light loss from the light source board, significantly reducing the luminous efficacy thereof. Additionally, the installation process for the currently available inverted Fuji-shaped lighting devices is relatively complex, demanding substantial labor input which increases manpower costs. By contrast, according to one embodiment of the present invention, the linear lighting device includes a tubular light cover, a support plate and a light source board. The tubular light cover has a light-emitting portion and a light-shielding portion. The light-emitting surface of the light-emitting portion is a curved surface. The bottom of the light-emitting portion has a lower opening. The top of the light-shielding portion has an upper opening. The bottom of the light-emitting portion is connected to the top of the light-shielding portion. The width of the bottom of the light-emitting portion is greater than the width of the top of the light-shielding portion. The support plate is disposed within the light-shielding portion and adjacent to the upper opening. The light source board is disposed on one side of the support plate and faces the light-emitting portion. Since the width of the bottom of the light-emitting portion is greater than the width of the top of the light-shielding portion, most of the light emitted from the light source board can pass through the light-emitting portion without being blocked by the light-shielding portion. This optical structure design can effectively reduce light loss from the light source board, such that the luminous efficacy of the linear lighting device can be significantly improved.

According to one embodiment of the present invention, the electronic components including the light source board and power module of the linear lighting device are all disposed within the tubular light cover thereof. The tubular light cover may be made of plastic, making it an all-plastic structure. This all-plastic structure can effectively prevent reverse voltage generation with a view to significantly improving the safety of the linear lighting device.

Also, according to one embodiment of the present invention, the power module of the linear lighting device is disposed within the tubular light cover thereof and is not housed in a power box, being only wrapped in plastic film. This built-in power module design not only effectively prevents reverse voltage generation to improve safety but also significantly simplifies the structure of the linear lighting device.

Further, according to one embodiment of the present invention, the linear lighting device further includes a base and a plurality of clips. The tubular light cover is disposed on the base. The base has a central groove, and the tubular light cover is disposed on the central groove and seals the central groove, so that the light-shielding portion is located within the central groove while the light-emitting portion is exposed outside the central groove. Each clip is U-shaped and includes a bottom plate, two side walls, and two protrusions. The bottom plate is fixed to the bottom of the central groove, and the protrusions are respectively disposed on the two side walls. The light-shielding portion has two recesses respectively disposed on the two sides of the light-shielding portion, and the two protrusions are respectively embedded in the two recesses to mutually fix the clip and the light-shielding portion. Through this single-side fastening structure, the tubular light cover can be fixed to the base without requiring additional fastening structures, simplifying the structure of the tubular light cover. Furthermore, these clips are not exposed outside the central groove, allowing the base structure to be further simplified. This structural design makes the linear lighting device more convenient for transportation and less prone to damage during transit.

Moreover, according to one embodiment of the present invention, the light source board of the linear lighting device is disposed on the support plate thereof, which can be made of a high thermal conductivity material (various metals such as copper, iron, aluminum, stainless steel, etc.) and is disposed within the tubular light cover. Therefore, the support plate not only provides heat dissipation effect but also serves as a structural support to enhance the structural strength of the tubular light cover. Additionally, the light source board is coated with reflective paint to improve luminous efficacy. Consequently, the service life of the linear lighting device can be effectively extended while further improving luminous efficacy to meet actual requirements.

Furthermore, according to one embodiment of the present invention, the linear lighting device further includes two end caps and two safety ropes. The two end caps are respectively disposed at the two ends of the tubular light cover and are respectively connected to the two ends of the base through the two safety ropes. Each end cap has a fixing structure. Each safety rope includes a rope body and a ball head connected to one end of the rope body. The ball head is fixed to the fixing structure, while the other end of the rope body is fixed to one end of the base. The fixing structure includes a post and a fixing hook. One end of the fixing hook is fixed to the bottom of the end cap, and the other end of the fixing hook is spaced apart from the bottom of the end cap to form an entrance. The post is fixed to the bottom of the end cap and disposed on one side of the entrance. The rope body passes through a central hole of the fixing hook so that the ball head is simultaneously limited by both the post and the fixing hook. Through this fixing structure design, the two end caps can be stably and quickly connected to the two ends of the base via the two safety ropes to prevent the tubular light cover from falling. Additionally, the user can temporarily hang the tubular light cover on the base using these safety ropes for wiring operations. Therefore, the installation process of the linear lighting device can be significantly simplified to reduce labor costs, while further improving the safety of the linear lighting device. As set forth above, the high luminous-efficacy linear lighting device according to the embodiments of the present invention can definitely achieve great technical effects.

Figure 10:
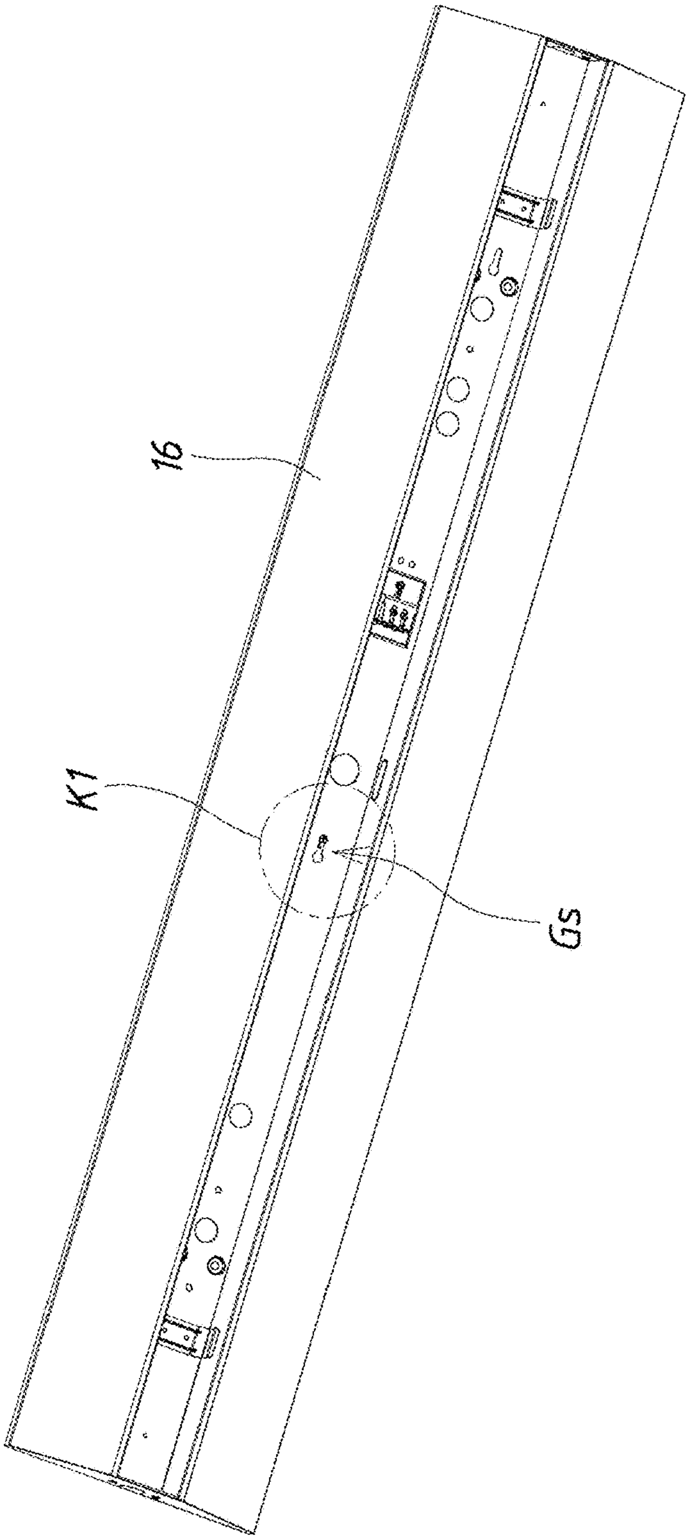
FIG. 10 is a first schematic view of an installation process of the high luminous-efficacy linear lighting device in accordance with the second embodiment of the present invention.
Figure 11:
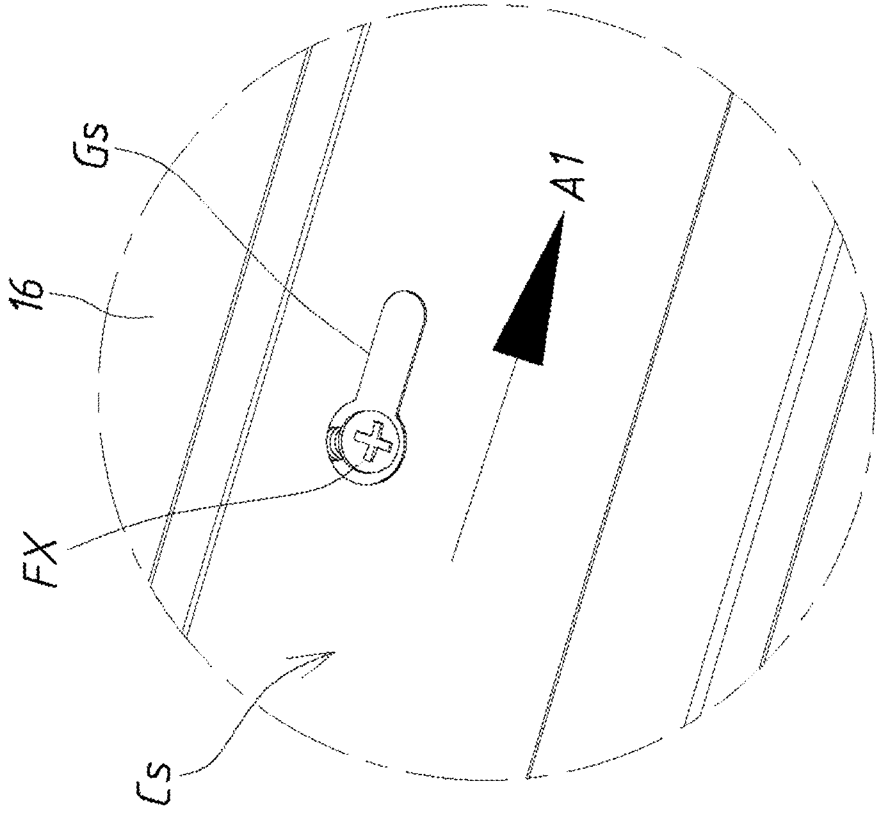
FIG. 11 is a first partial enlargement view of an area K1 in FIG. 10.
Figure 12:
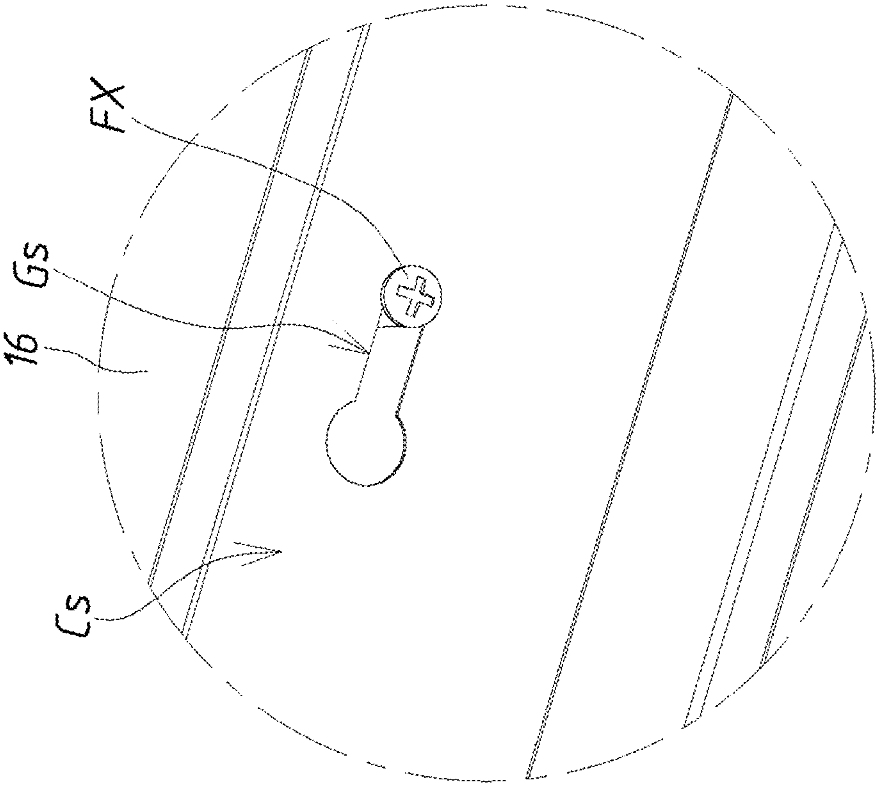
FIG. 12 is a second partial enlargement view of the area K1 in FIG. 10.

Please refer to FIG. 10, FIG. 11, and FIG. 12, and also refer to FIG. 1 to FIG. 9. FIG. 10 is a first schematic view of an installation process of the high luminous-efficacy linear lighting device in accordance with the second embodiment of the present invention. FIG. 11 is a first partial enlargement view of an area K1 in FIG. 10. FIG. 12 is a second partial enlargement view of the area K1 in FIG. 10. As shown in FIG. 10, the bottom of the central groove Cs of the base 16 further has installation holes Gs, and the installation holes Gs may be keyhole-shaped.

As shown in FIG. 11, the user may first fix a fastener FX (such as screw, nail, or other similar components) to the ceiling. Then, the user may place the base 16 on the ceiling and align the installation hole Gs with the fastener FX, allowing the head of the fastener FX to enter one end of the installation hole Gs. Next, the user may push the base 16 to move it toward the other end of the installation hole Gs (as indicated by the arrow A1 in FIG. 11).

Then, as the base 16 moves toward the other end of the installation hole Gs, the head of the fastener FX enter the other end of the installation hole Gs, as shown in FIG. 12. Thus, the user can temporarily secure the base 16 to the ceiling using the fastener FX, and then fix the two ends of the base 16 to the ceiling using other fasteners FX.

Without the design of the installation holes Gs, the user would need to first fix one end of the base 16 to the ceiling while another person holds the other end, making installation extremely inconvenient. With the installation hole Gs design, the user can temporarily secure the base 16 to the ceiling before fixing both ends, making the installation process more convenient and labor-saving.

The embodiment just exemplifies the present invention and is not intended to limit the scope of the present invention; any equivalent modification and variation according to the spirit of the present invention is to be also included within the scope of the following claims and their equivalents.

Figure 13:
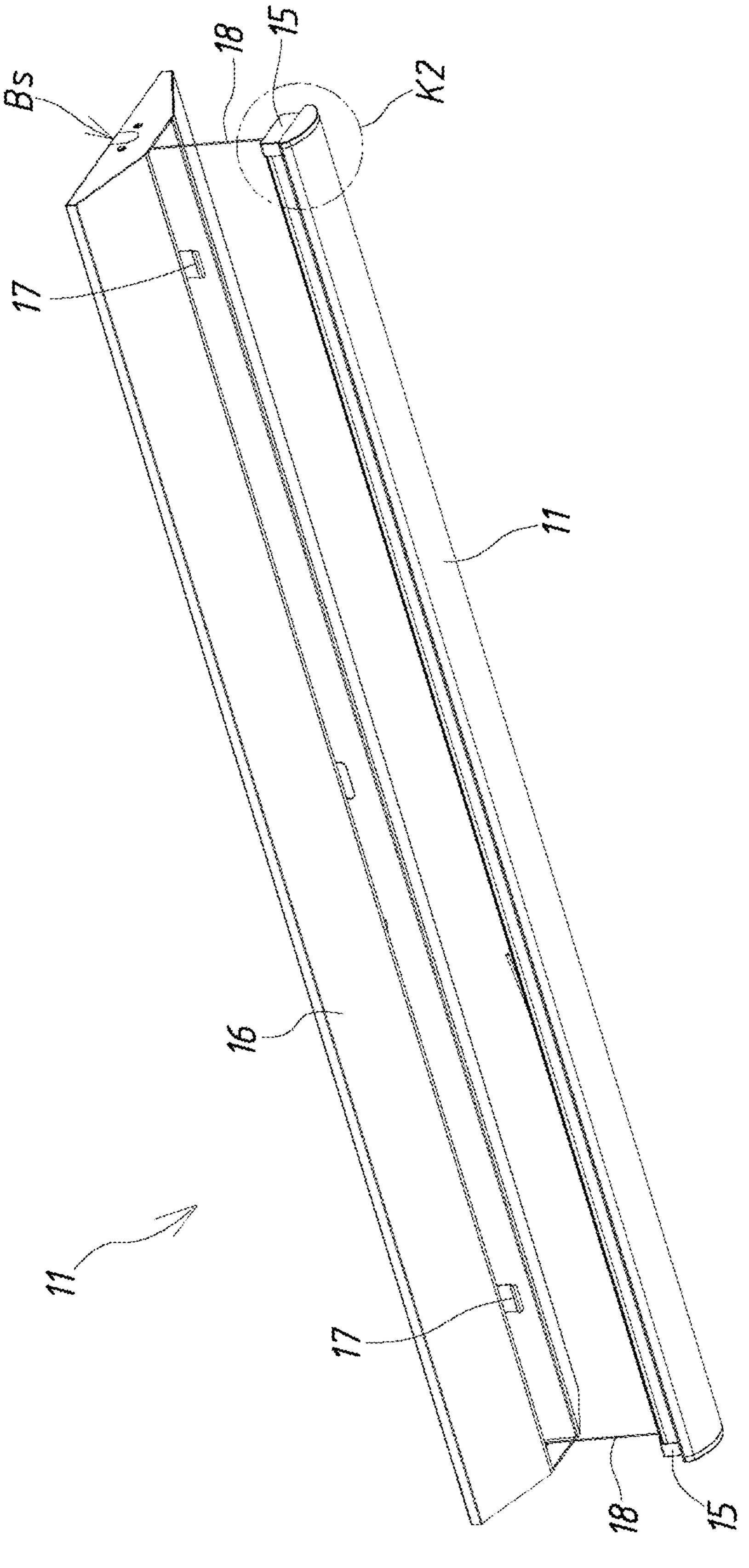
FIG. 13 is a second schematic view of an installation process of the high luminous-efficacy linear lighting device in accordance with the second embodiment of the present invention.
Figure 16:
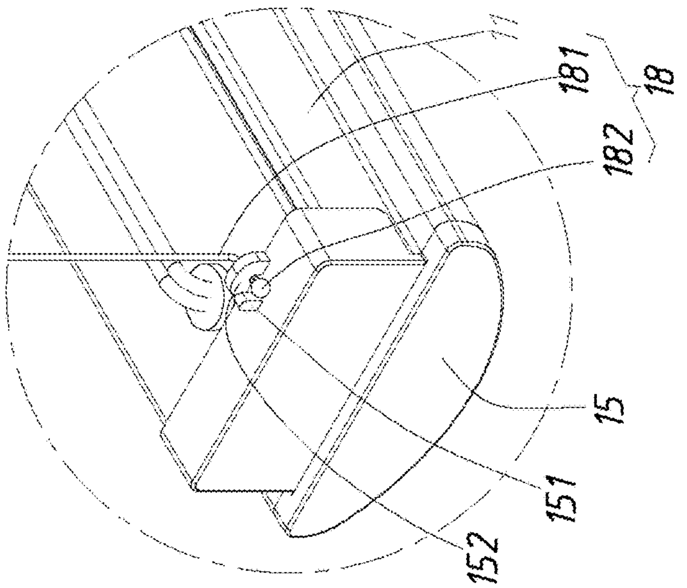
FIG. 16 is a third partial enlargement view of the area K2 in FIG. 13.
Figure 15:
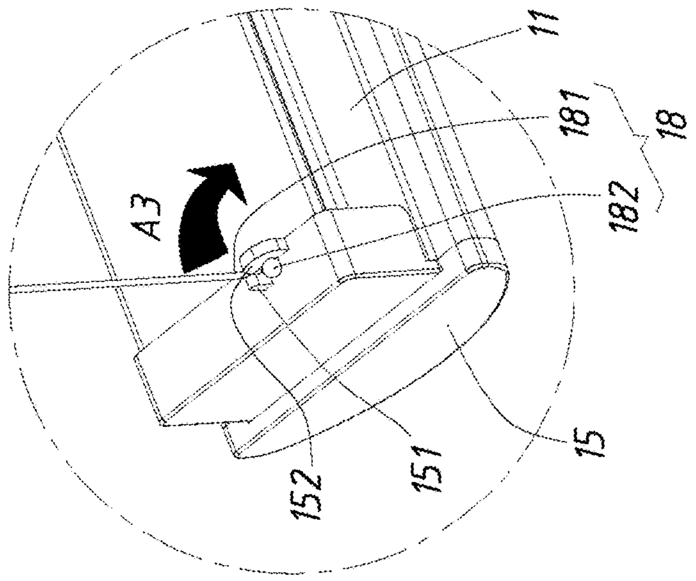
FIG. 15 is a second partial enlargement view of the area K2 in FIG. 13.
Figure 14:
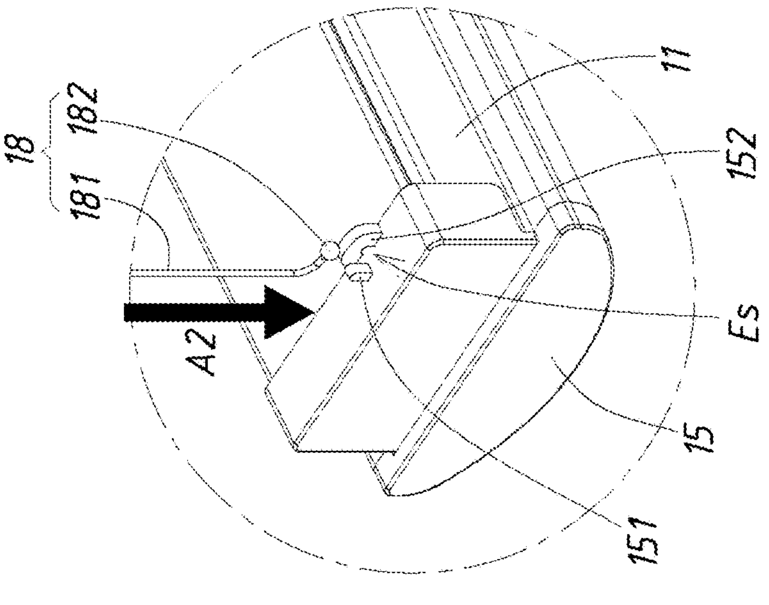
FIG. 14 is a first partial enlargement view of an area K2 in FIG. 13.

Please refer to FIG. 13, FIG. 14, FIG. 15, and FIG. 16, and also refer to FIG. 1 to FIG. 12. FIG. 13 is a second schematic view of an installation process of the high luminous-efficacy linear lighting device in accordance with the second embodiment of the present invention. FIG. 14 is a first partial enlargement view of an area K2 in FIG. 13. FIG. 15 is a second partial enlargement view of the area K2 in FIG. 13. FIG. 16 is a third partial enlargement view of the area K2 in FIG. 13. As shown in FIG. 13, after the base 16 is fixed to the ceiling, the user can temporarily hang the tubular light cover 11 on the base 16 using the two safety ropes 18 to perform wiring work.

As shown in FIG. 14, each safety rope 18 includes a rope body 181 and a ball head 182 connected to one end of the rope body 181. Each end cap 15 has a fixing structure that includes a post 151 and a fixing hook 152. One end of the fixing hook 152 is fixed to the bottom of the end cap 15, while the other end of the fixing hook 152 is spaced apart from the bottom of the end cap 15 to form an entrance Es. The post 151 is fixed to the bottom of the end cap 15 and located on one side of the entrance Es.

The user can move the ball head 182 toward the space between the post 151 and the fixing hook 152 (as indicated by the arrow A2 in FIG. 14).

As shown in FIG. 15, the user moves the ball head 182 toward the space between the post 151 and the fixing hook 152, allowing the end of the rope body 181 near the ball head 182 to enter the space between the post 151 and the fixing hook 152. Then, the user can pull the rope body 181 toward the entrance Es, allowing the rope body 181 to pass through the entrance Es and enter the central hole of the fixing hook 152.

As shown in FIG. 16, after the rope body 181 passes through the entrance Es and enters the central hole of the fixing hook 152, the rope body 181 can pass through the central hole of the fixing hook 152. Thus, the ball head 182 can be simultaneously limited by both the post 151 and the fixing hook 152. In this way, the ball head 182 can be fixed to the fixing structure, while the other end of the rope body 181 is fixed to one end of the base 16.

Through this fixing structure design, the two end caps 15 can be stably and quickly connected to the two ends of the base 16 via the two safety ropes 18. The user can temporarily hang the tubular light cover 11 on the base 16 using the two safety ropes 18 to perform wiring work. Therefore, the installation process of the linear lighting device 1 can be greatly simplified, which can effectively reduce labor costs.

Additionally, since the fixing structure is disposed on the two end caps 15 rather than on the tubular light cover 11, the structure of the tubular light cover 11 can be further simplified.

After the installation process is completed, the two safety ropes 18 can also prevent the tubular light cover 11 from falling. Therefore, the safety of the linear lighting device 1 can be further improved.

The embodiment just exemplifies the present invention and is not intended to limit the scope of the present invention; any equivalent modification and variation according to the spirit of the present invention is to be also included within the scope of the following claims and their equivalents.

Figure 18:
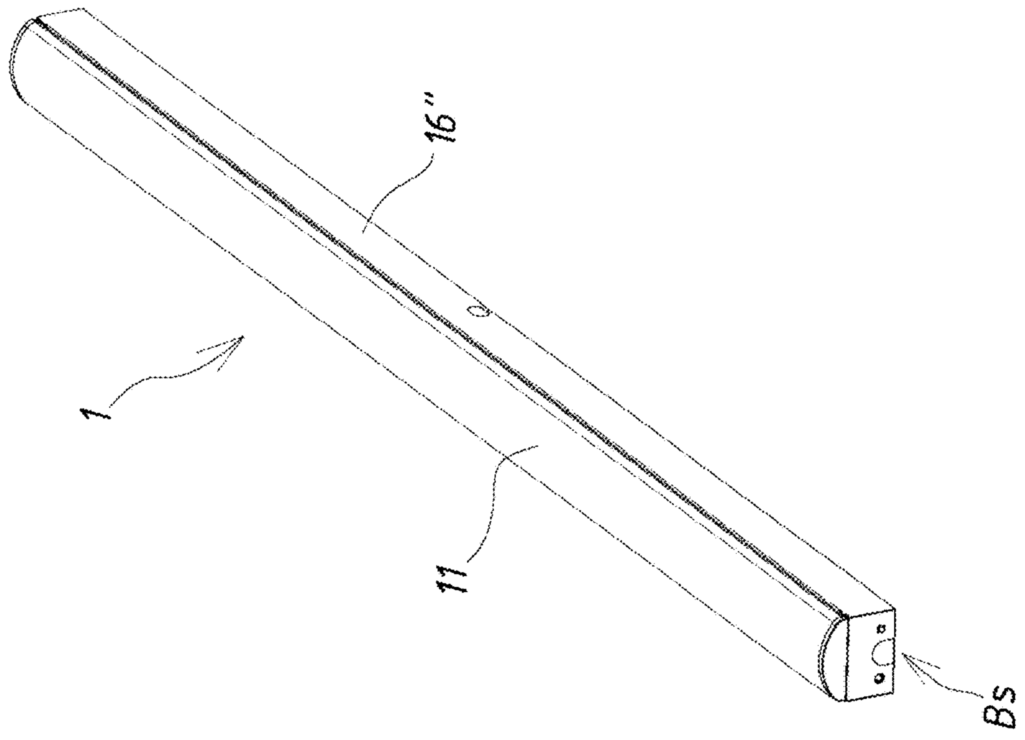
FIG. 18 is a perspective view of a high luminous-efficacy linear lighting device in accordance with a fourth embodiment of the present invention.
Figure 17:
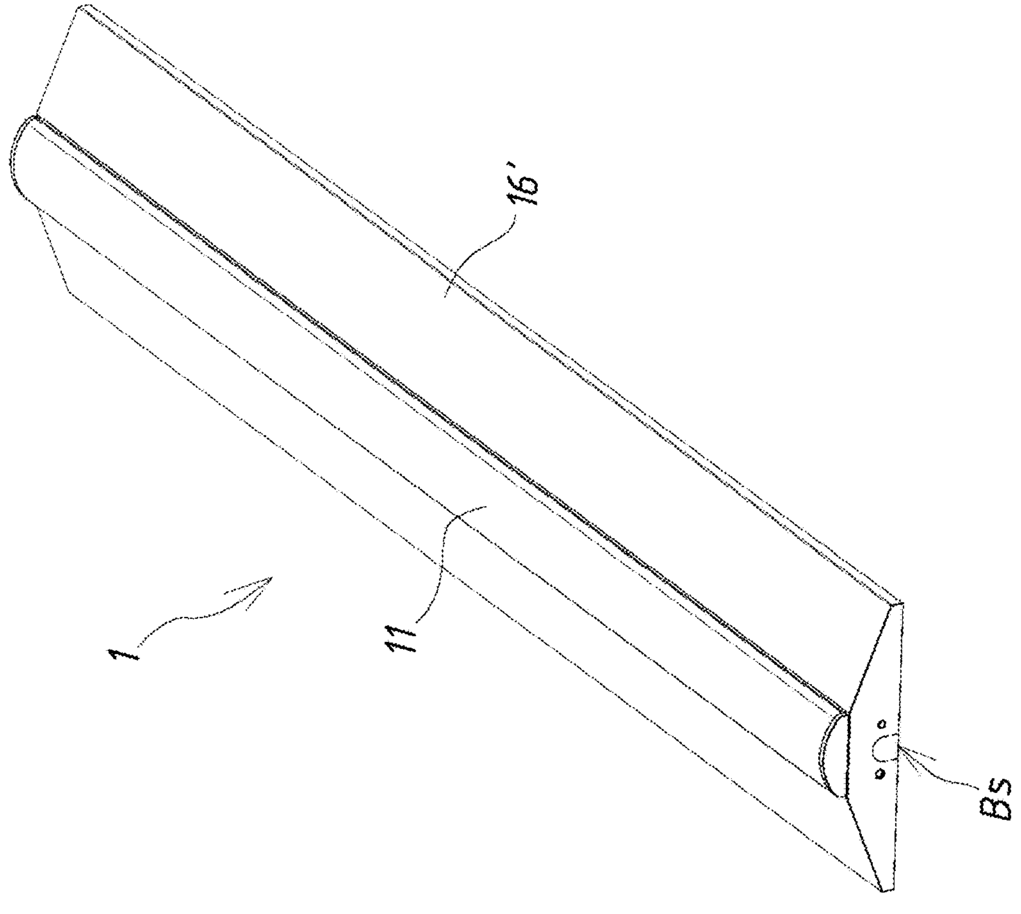
FIG. 17 is a perspective view of a high luminous-efficacy linear lighting device in accordance with a third embodiment of the present invention.

Please refer to FIG. 17 and FIG. 18. FIG. 17 is a perspective view of a high luminous-efficacy linear lighting device in accordance with a third embodiment of the present invention. FIG. 18 is a perspective view of a high luminous-efficacy linear lighting device in accordance with a fourth embodiment of the present invention. As shown in FIG. 17 and FIG. 18., the tubular light cover 11 can be combined with different bases (such as the base 16' shown in FIG. 17 and the base 16" shown in FIG. 18), allowing the linear lighting device 1 to have different appearances and functions.

Therefore, the tubular light cover 11 can be sold as an independent product, providing greater flexibility in use. At the same time, this structural design can effectively reduce inventory, thereby lowering costs.

The embodiment just exemplifies the present invention and is not intended to limit the scope of the present invention; any equivalent modification and variation according to the spirit of the present invention is to be also included within the scope of the following claims and their equivalents.

Figure 19:
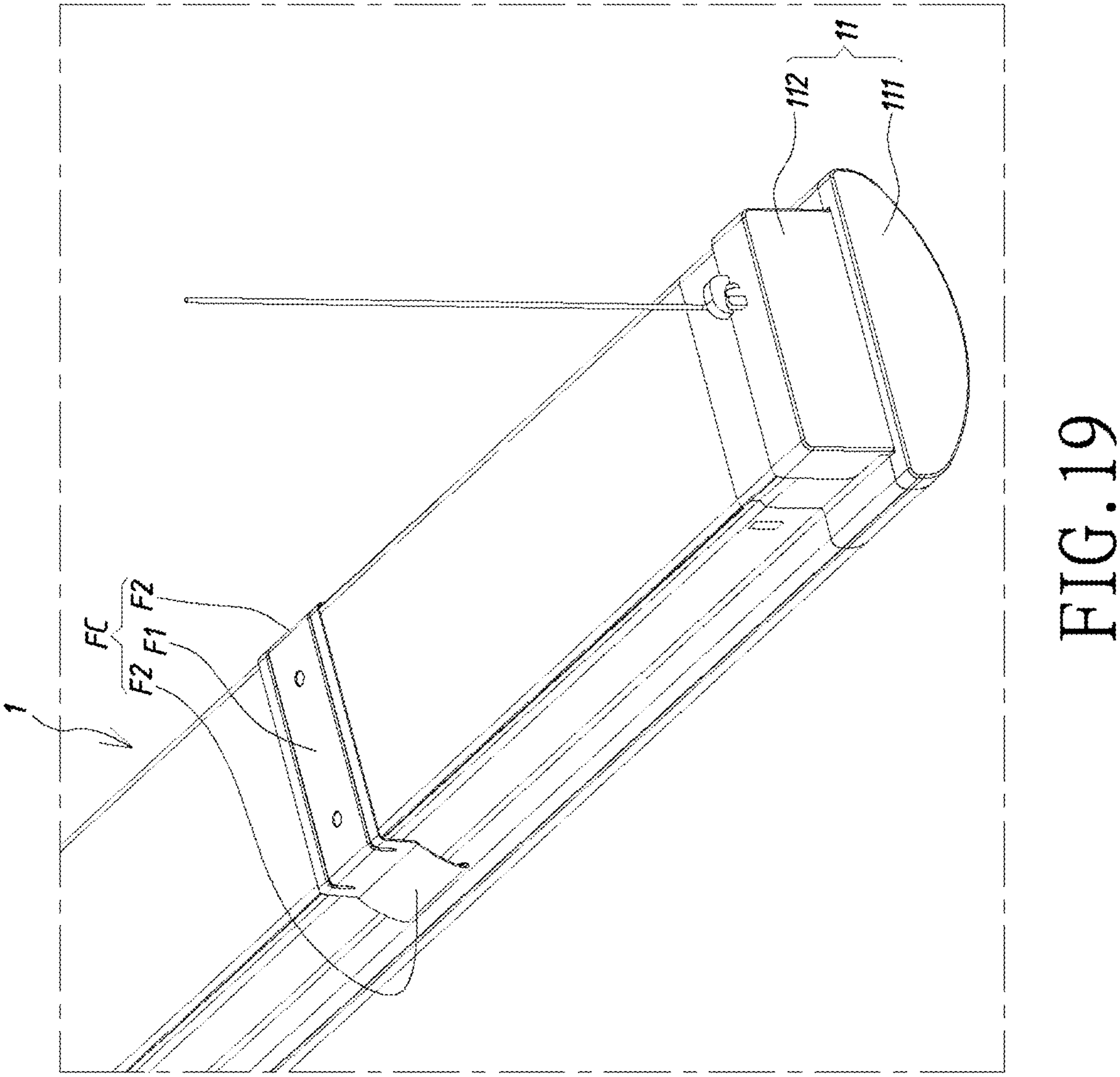
FIG. 19 is a partial enlargement view of a high luminous-efficacy linear lighting device in accordance with a fifth embodiment of the present invention.

Please refer to FIG. 19, which is a partial enlargement view of a high luminous-efficacy linear lighting device in accordance with a fifth embodiment of the present invention. As shown in FIG. 19, the linear lighting device 1 includes a tubular light cover 11, the structure of which is the same as that in the first embodiment (FIG. 1 to FIG. 3), and thus will not be described again in detail.

Different from the first embodiment, the linear lighting device 1 further includes a fastening clip FC, which can be disposed on the light-shielding portion 112 of the tubular light cover 11. The fastening clip FC includes a fixing portion F1 and two elastic wing portions F2. The two elastic wing portions F2 are connected to each other through the fixing portion F1. The fixing portion F1 is fixed to the bottom surface of the light-shielding portion 112, and the two elastic wing portions F2 are respectively located on both sides of the light-shielding portion 112.

The embodiment just exemplifies the present invention and is not intended to limit the scope of the present invention; any equivalent modification and variation according to the spirit of the present invention is to be also included within the scope of the following claims and their equivalents.

Figure 20:
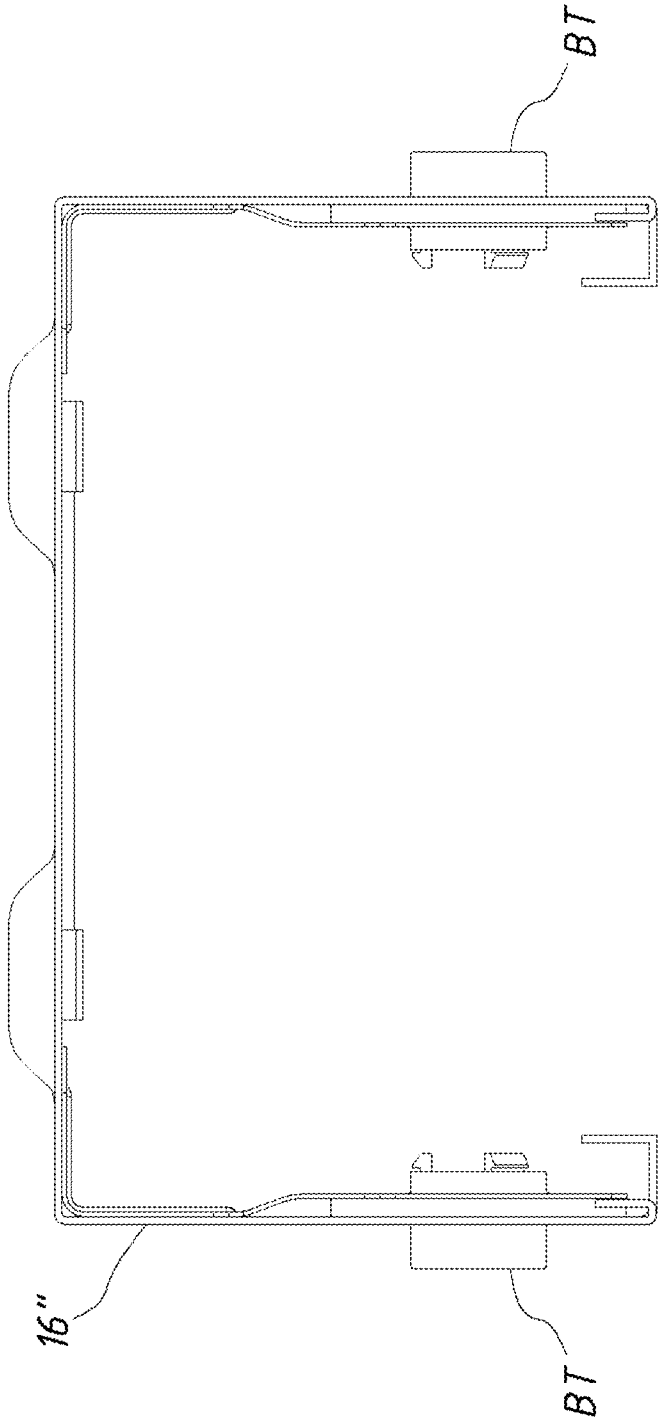
FIG. 20 is a partial enlargement view of a base of the high-efficiency linear lighting device in accordance with the fifth embodiment of the present invention.

Please refer to FIG. 20, which is a partial enlargement view of a base of the high-efficiency linear lighting device in accordance with the fifth embodiment of the present invention. As shown in FIG. 20, the linear lighting device 1 further includes a base 16". The structure of the base 16" is the same as that in the fourth embodiment (FIG. 18), and thus will not be described again in detail. Different from the fourth embodiment, both sides of the base 16" are provided with buttons BT.

The embodiment just exemplifies the present invention and is not intended to limit the scope of the present invention; any equivalent modification and variation according to the spirit of the present invention is to be also included within the scope of the following claims and their equivalents.

Figure 21:
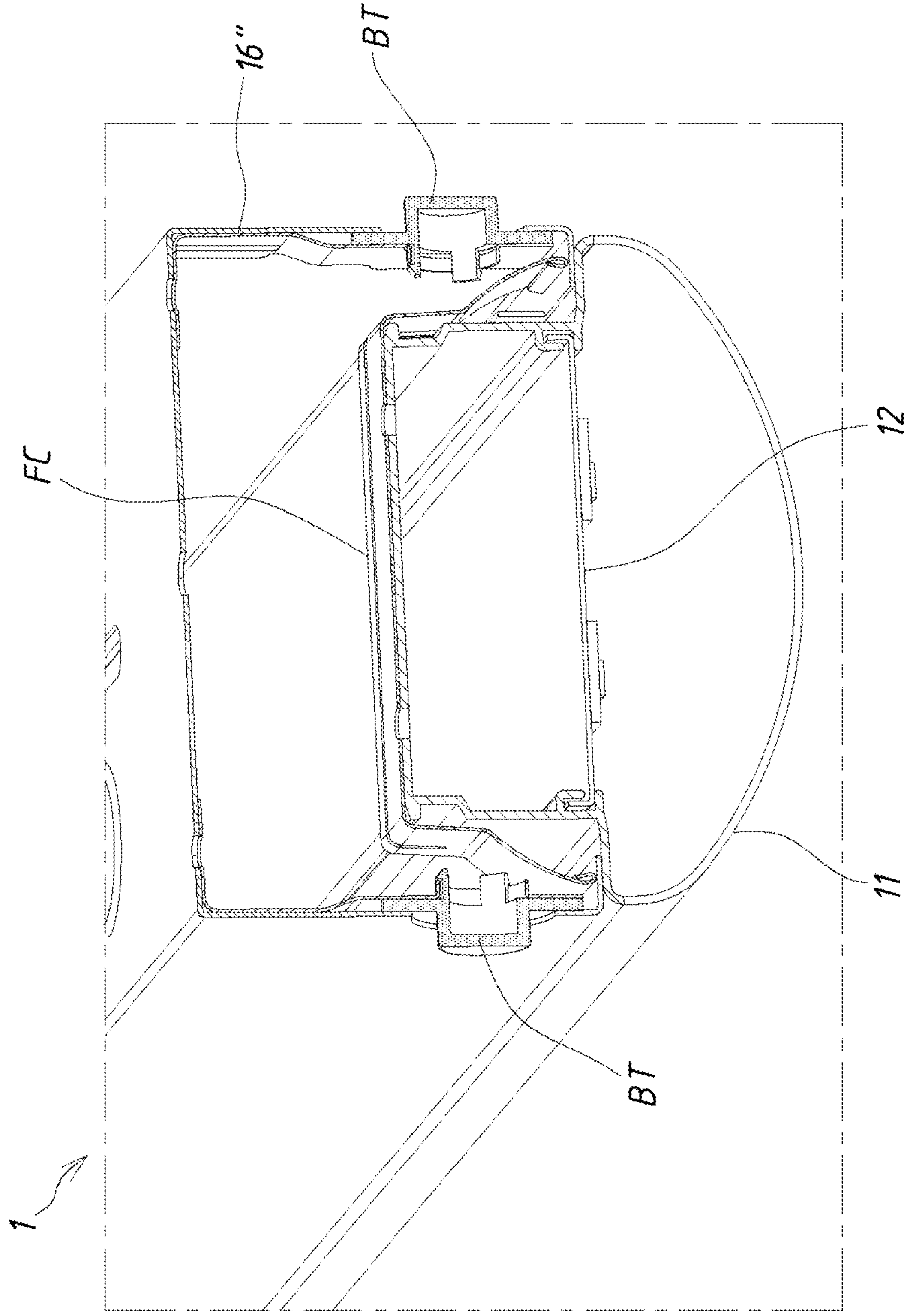
FIG. 21 is a sectional view of the high-efficiency linear lighting device in accordance with the fifth embodiment of the present invention.

Please refer to FIG. 21, which is a sectional view of the high-efficiency linear lighting device in accordance with the fifth embodiment of the present invention. As shown in FIG. 21, both sides of the base 16" are provided with hook portions US. The hook portions US may be U-shaped, but are not limited thereto. In another embodiment, the hook portions US may also be hook-shaped or have other similar shapes.

When the tubular light cover 11 is fixed onto the base 16, the two elastic wing portions F2 may be respectively embedded into the two hook portions US to provide a clamping force, thereby allowing the tubular light cover 11 and the base 16 to be fixed to each other.

In addition, the positions of the two buttons BT correspond exactly to the positions of the two elastic wing portions F2. Therefore, the user can press the two buttons BT to respectively push the two elastic wing portions F2 and cause them to deform. As a result, the two elastic wing portions F2 will temporarily lose their clamping force, allowing the user to separate the tubular light cover 11 from the base 16". Each button BT may be provided with a spring, such that the bottom BT can return to its original position when not pressed. In another embodiment, the linear lighting device 1 may also include more than two fastening clips FC, and the base 16" may also have more than two buttons BT corresponding to the fastening clips FC.

Through the above structural design, the user can easily fix the tubular light cover 11 to the base 16" or quickly detach the tubular light cover 11 from the base 16" by pressing the buttons BT. Therefore, the above structural design enables the user to more conveniently disassemble or assemble the linear lighting device 1. In addition, the structural design also enhances the structural stability of the linear lighting device 1.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the linear lighting device includes a tubular light cover, a support plate and a light source board. The tubular light cover has a light-emitting portion and a light-shielding portion. The light-emitting surface of the light-emitting portion is a curved surface. The bottom of the light-emitting portion has a lower opening. The top of the light-shielding portion has an upper opening. The bottom of the light-emitting portion is connected to the top of the light-shielding portion. The width of the bottom of the light-emitting portion is greater than the width of the top of the light-shielding portion. The support plate is disposed within the light-shielding portion and adjacent to the upper opening. The light source board is disposed on one side of the support plate and faces the light-emitting portion. Since the width of the bottom of the light-emitting portion is greater than the width of the top of the light-shielding portion, most of the light emitted from the light source board can pass through the light-emitting portion without being blocked by the light-shielding portion. This optical structure design can effectively reduce light loss from the light source board, such that the luminous efficacy of the linear lighting device can be significantly improved.

According to one embodiment of the present invention, the electronic components including the light source board and power module of the linear lighting device are all disposed within the tubular light cover thereof. The tubular light cover may be made of plastic, making it an all-plastic structure. This all-plastic structure can effectively prevent reverse voltage generation with a view to significantly improving the safety of the linear lighting device.

Also, according to one embodiment of the present invention, the power module of the linear lighting device is disposed within the tubular light cover thereof and is not housed in a power box, being only wrapped in plastic film. This built-in power module design not only effectively prevents reverse voltage generation to improve safety but also significantly simplifies the structure of the linear lighting device.

Further, according to one embodiment of the present invention, the linear lighting device further includes a base and a plurality of clips. The tubular light cover is disposed on the base. The base has a central groove, and the tubular light cover is disposed on the central groove and seals the central groove, so that the light-shielding portion is located within the central groove while the light-emitting portion is exposed outside the central groove. Each clip is U-shaped and includes a bottom plate, two side walls, and two protrusions. The bottom plate is fixed to the bottom of the central groove, and the protrusions are respectively disposed on the two side walls. The light-shielding portion has two recesses respectively disposed on the two sides of the light-shielding portion, and the two protrusions are respectively embedded in the two recesses to mutually fix the clip and the light-shielding portion. Through this single-side fastening structure, the tubular light cover can be fixed to the base without requiring additional fastening structures, simplifying the structure of the tubular light cover. Furthermore, these clips are not exposed outside the central groove, allowing the base structure to be further simplified. This structural design makes the linear lighting device more convenient for transportation and less prone to damage during transit.

Moreover, according to one embodiment of the present invention, the light source board of the linear lighting device is disposed on the support plate thereof, which can be made of a high thermal conductivity material (various metals such as copper, iron, aluminum, stainless steel, etc.) and is disposed within the tubular light cover. Therefore, the support plate not only provides heat dissipation effect but also serves as a structural support to enhance the structural strength of the tubular light cover. Additionally, the light source board is coated with reflective paint to improve luminous efficacy. Consequently, the service life of the linear lighting device can be effectively extended while further improving luminous efficacy to meet actual requirements.

Furthermore, according to one embodiment of the present invention, the linear lighting device further includes two end caps and two safety ropes. The two end caps are respectively disposed at the two ends of the tubular light cover and are respectively connected to the two ends of the base through the two safety ropes. Each end cap has a fixing structure. Each safety rope includes a rope body and a ball head connected to one end of the rope body. The ball head is fixed to the fixing structure, while the other end of the rope body is fixed to one end of the base. The fixing structure includes a post and a fixing hook. One end of the fixing hook is fixed to the bottom of the end cap, and the other end of the fixing hook is spaced apart from the bottom of the end cap to form an entrance. The post is fixed to the bottom of the end cap and disposed on one side of the entrance. The rope body passes through a central hole of the fixing hook so that the ball head is simultaneously limited by both the post and the fixing hook. Through this fixing structure design, the two end caps can be stably and quickly connected to the two ends of the base via the two safety ropes to prevent the tubular light cover from falling. Additionally, the user can temporarily hang the tubular light cover on the base using these safety ropes for wiring operations. Therefore, the installation process of the linear lighting device can be significantly simplified to reduce labor costs, while further improving the safety of the linear lighting device.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high luminous-efficacy linear lighting device, comprising:

a tubular light cover having a light-emitting portion and a light-shielding portion, wherein a light-emitting surface of the light-emitting portion is a curved surface, a bottom of the light-emitting portion has a lower opening, a top of the light-shielding portion has an upper opening, the bottom of the light-emitting portion is connected to the top of the light-shielding portion, and a width of the bottom of the light-emitting portion is greater than a width of the top of the light-shielding portion;

a support plate disposed within the light-shielding portion and adjacent to the upper opening;

a light source board disposed on one side of the support plate and facing the light-emitting portion; and a base having a groove, wherein the tubular light cover is disposed on the central groove and seals the central groove, whereby the light-shielding portion is disposed within the central groove while the light-emitting portion is exposed outside the central groove.

2. The high luminous-efficacy linear lighting device as claimed in claim 1, wherein the tubular light cover is made of plastic.

3. The high luminous-efficacy linear lighting device as claimed in claim 1, further comprising a power module disposed on another side of the support plate and within the light-shielding portion, wherein the power module is electrically connected to the light source board.

4. The high luminous-efficacy linear lighting device as claimed in claim 1, further comprising a clip, wherein the clip is U-shaped and includes a bottom plate, two side walls, and two protrusions, wherein the bottom plate is fixed to a bottom of the central groove, the protrusions are respectively disposed on the side walls, the light-shielding portion has two grooves respectively disposed on two sides of the light-shielding portion, and the protrusions are respectively embedded in the two grooves, whereby the clip and the light-shielding portion are fixed with each other.

5. The high luminous-efficacy linear lighting device as claimed in claim 1, wherein the bottom of the central groove further has an installation hole, and the installation hole is in a shape of a keyhole.

6. The high luminous-efficacy linear lighting device as claimed in claim 1, further comprising two end caps and two safety ropes, wherein the end caps are respectively disposed at two ends of the tubular light cover and are respectively connected to two ends of the base via the two safety ropes.

7. The high luminous-efficacy linear lighting device as claimed in claim 6, wherein each of the end caps has a fixing structure, each of the safety ropes comprises a rope body and a ball head connected to one end of the rope body, the ball head is fixed to the fixing structure, and another end of the rope body is fixed to one end of the base.

8. The high luminous-efficacy linear lighting device as claimed in claim 7, wherein the fixing structure comprises a post and a fixing hook, one end of the fixing hook is fixed to a bottom of the end cap, another end of the fixing hook is spaced apart from the bottom of the end cap to form an entrance, the post is fixed to the bottom of the end cap and disposed on one side of the entrance, the rope body passes through a central hole of the fixing hook, whereby the ball head is simultaneously limited by the post and the fixing hook.

* * * * *